US005611200A

United States Patent [19]

Moenkhaus

[11] Patent Number: 5,611,200

[45] Date of Patent: Mar. 18, 1997

[54] LINEAR HYDRAULIC ACTUATOR WITH ADJUSTABLE OUTPUT SPEED

[75] Inventor: Patrick R. Moenkhaus, Mounds View, Minn.

[73] Assignee: Honeywell Inc., Minneapolis, Minn.

[21] Appl. No.: 98,147

[22] Filed: Jul. 28, 1993

[51] Int. Cl.[6] F16D 31/02

[52] U.S. Cl. 60/477; 60/494; 417/440

[58] Field of Search 60/370, 371, 407, 60/408, 477, 478, 494; 91/246, 252, 262, 249, 263, 271, 272, 273, 274, 335, 336, 356; 417/440

[56] References Cited

U.S. PATENT DOCUMENTS

| | | | |
|---|---|---|---|
| 2,669,095 | 2/1954 | Berger | 60/477 |
| 2,724,433 | 11/1955 | Witherell | 417/440 |
| 2,737,928 | 3/1956 | Neff et al. | 91/356 |
| 3,272,132 | 9/1966 | Stoelting et al. | 417/440 |
| 3,295,748 | 1/1967 | Leitgeb | 417/440 |
| 3,375,758 | 4/1968 | Novak et al. | 91/356 |
| 3,412,685 | 11/1968 | Connelly | 417/440 |
| 3,503,304 | 3/1970 | Comeau et al. | 91/336 |
| 3,677,456 | 7/1972 | Ramspeck et al. | 91/356 X |
| 3,685,396 | 8/1972 | Obergfell | 91/356 |
| 3,817,034 | 6/1974 | Nott | 60/478 |
| 3,943,830 | 3/1976 | Sugivra | 92/63 |
| 4,161,308 | 7/1979 | Bell et al. | 91/336 X |
| 4,213,301 | 7/1980 | Maier et al. | 60/407 |
| 4,422,831 | 12/1983 | Schmid | 417/440 X |
| 4,435,134 | 3/1984 | Okada et al. | 417/440 X |
| 4,662,603 | 5/1987 | Etheridge | 251/63.5 |
| 4,838,768 | 6/1989 | Flaherty | 417/440 X |
| 5,097,857 | 3/1992 | Mayhew | 137/1 |
| 5,109,812 | 5/1992 | Erickson et al. | 123/90.12 |

*Primary Examiner*—Hoang Nguyen
*Attorney, Agent, or Firm*—Edward L. Schwarz

[57] ABSTRACT

A linear hydraulic actuator has a reciprocating pump which provides pressurized hydraulic fluid contained in a reservoir to a hydraulic cylinder in which slides a piston which supplies the actuator output. A diverter valve in flow communication with the pressurized hydraulic fluid has an adjustment shaft allowing manual adjustment of the rate of flow of pressurized hydraulic fluid to the cylinder. Preferably the pump is immersed in the hydraulic fluid held by the reservoir, and the adjustment shaft of the diverter valve penetrates a wall of the reservoir to allow external adjustment of the diverter valve.

3 Claims, No Drawings

LINEAR HYDRAULIC ACTUATOR WITH ADJUSTABLE OUTPUT SPEED

BACKGROUND OF THE INVENTION

There are any number of different designs for the linear or rotary actuators which are used to operate or position various types of mechanical devices such as valves, dampers, machine tools, etc. The force for operation is in most cases supplied either electrically or pneumatically. Most electrical actuators use an electric motor as prime mover driving through some type of speed reduction mechanism to provide the required level of torque or force. A very common design for these actuators has a gear train to reduce the speed and increase the output force or torque. (It is of course well known that linear output can be easily transformed into rotary output and vice versa with mechanical arms or a rack and pinion.)

There is also a class of electrically powered actuators, typically for providing linear output, which uses a hydraulic connection between the electric motor and the output element. In such hydraulic actuators, the electric motor drives a pump which supplies pressurized hydraulic fluid to a cylinder to move a piston sliding therein and to which the actuator's output element is connected. Hydraulic actuators which have been commercially available for several years from the assignee of this application have an electric motor which drives a reciprocating pump having two pumping chambers, allowing two volumes of hydraulic fluid to be ejected to the output cylinder for each rotation of the motor. In this design, the pump is completely submerged.

For certain actuator applications it is important to accurately control the operating speed of the output element. For example, the speed at which a fuel valve for a burner is opened must in some cases be tailored to the particular burner and fuel supply pressure to prevent flame-out and allow smooth lightoff. This means that in many instances, actuators having different operating speeds must be installed in different systems for optimal operation in every case.

For hydraulic actuators, it is axiomatic that speed of output element movement may be changed only by altering the flow rate of the hydraulic fluid supplied to the output element cylinder. For the actuator with the two chamber pump mentioned above, the operating speed can be cut in half by disabling one of the chambers producing the pressurized hydraulic fluid, and this feature has been available for several years. It is also possible to control output element operating speed by altering pump motor speed, but this is relatively expensive and complex. In a variation on this design, the pump motor can be rapidly cycled on and off, varying the motor duty cycle to control operating speed. But motor cycling results in pulsating movement of the output element and can also result in relatively rapid wear rates for the motor and pump. It is also theoretically possible for a supplier to simply provide a number of models of actuators each having a different fixed operating speed. However, this allows only a gross change in the operating speed, and creates nightmarish product stocking and selection problems.

U.S. Pat. No. 5,097,857 (Mayhew) discloses an example of one type of motor driven hydraulic actuator. Mayhew briefly alludes to the desirability of providing variable thrust and/or torque to vary the speed of operation.

BRIEF DESCRIPTION OF THE INVENTION

To control output element speed the actuator apparatus of this invention alters the flow rate of the pressurized hydraulic fluid with an adjustable diverter valve which diverts a selectable amount of the pressurized hydraulic fluid from the pump back to the reservoir. Such an actuator has a housing in which a hydraulic cylinder is mounted. A piston having a connecting rod providing the actuator output slides in the cylinder. A motor is mounted in the housing, as is a reservoir containing a supply of hydraulic fluid. A pump driven by the motor is also mounted in the housing, and has a pumping chamber having an intake port in flow communication with the reservoir and an outlet port in flow communication with the cylinder. The invention's improvement comprises a manually adjustable diverter valve in flow communication with the outlet port. The diverter valve diverts a selectable amount of pressurized hydraulic fluid back to the reservoir.

In one embodiment, the diverter valve has a stem by which it is adjusted, and the stem is accessible from outside the housing. A preferred variation of this embodiment has the diverter valve stem penetrating the housing so as to provide maximum accessibility when adjusting operating speed. The diverter valve has a tapered port and element, allowing relatively precise control of flow rate or pressure drop across the valve.

BRIEF DESCRIPTION OF THE DRAWING

The Figure is a cross section view of an electrically powered, hydraulically operated actuator having an externally accessible operating speed adjustment.

DESCRIPTION OF THE PREFERRED EMBODIMENTS

Figure 1:
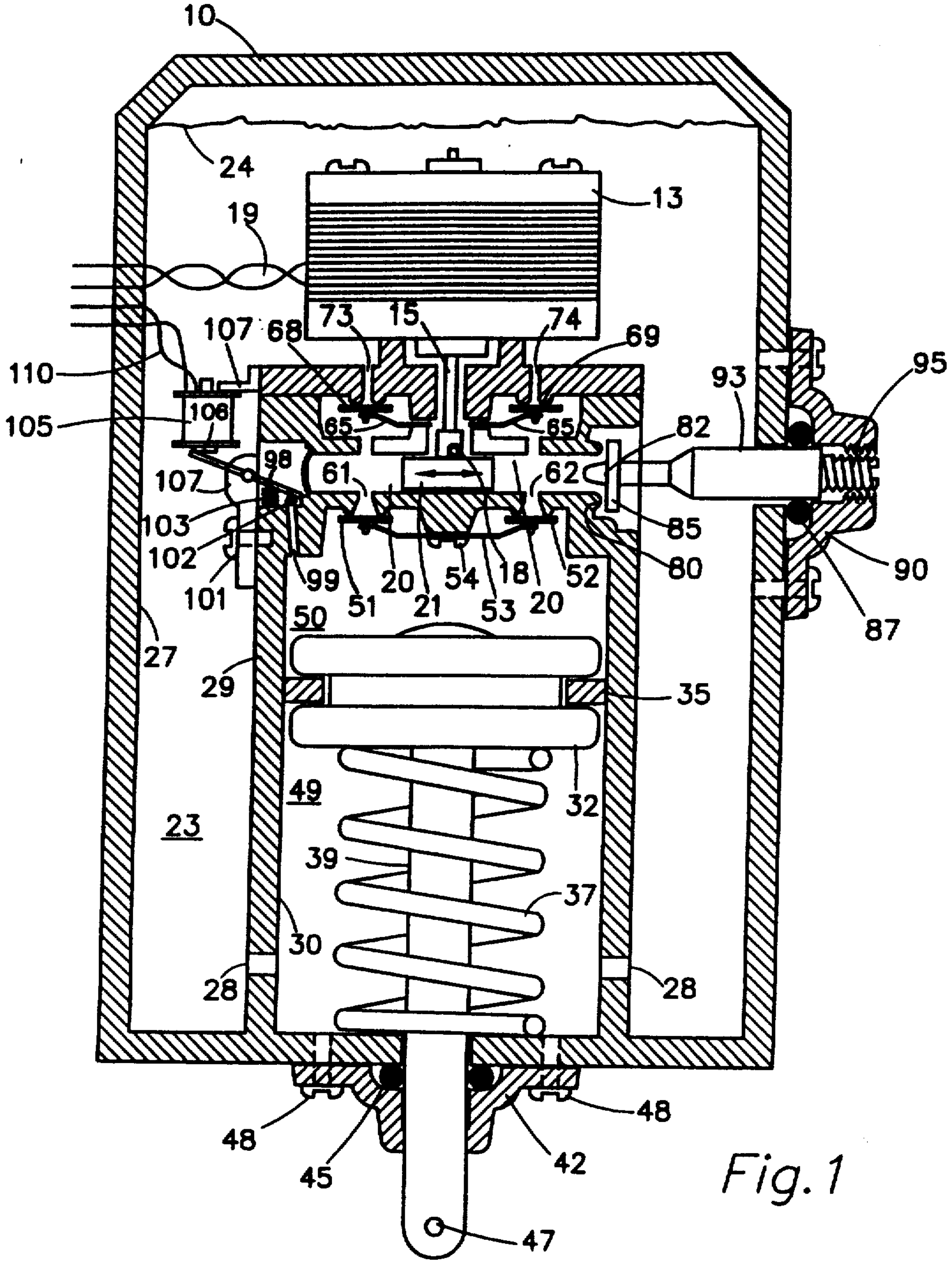
Figure 1:
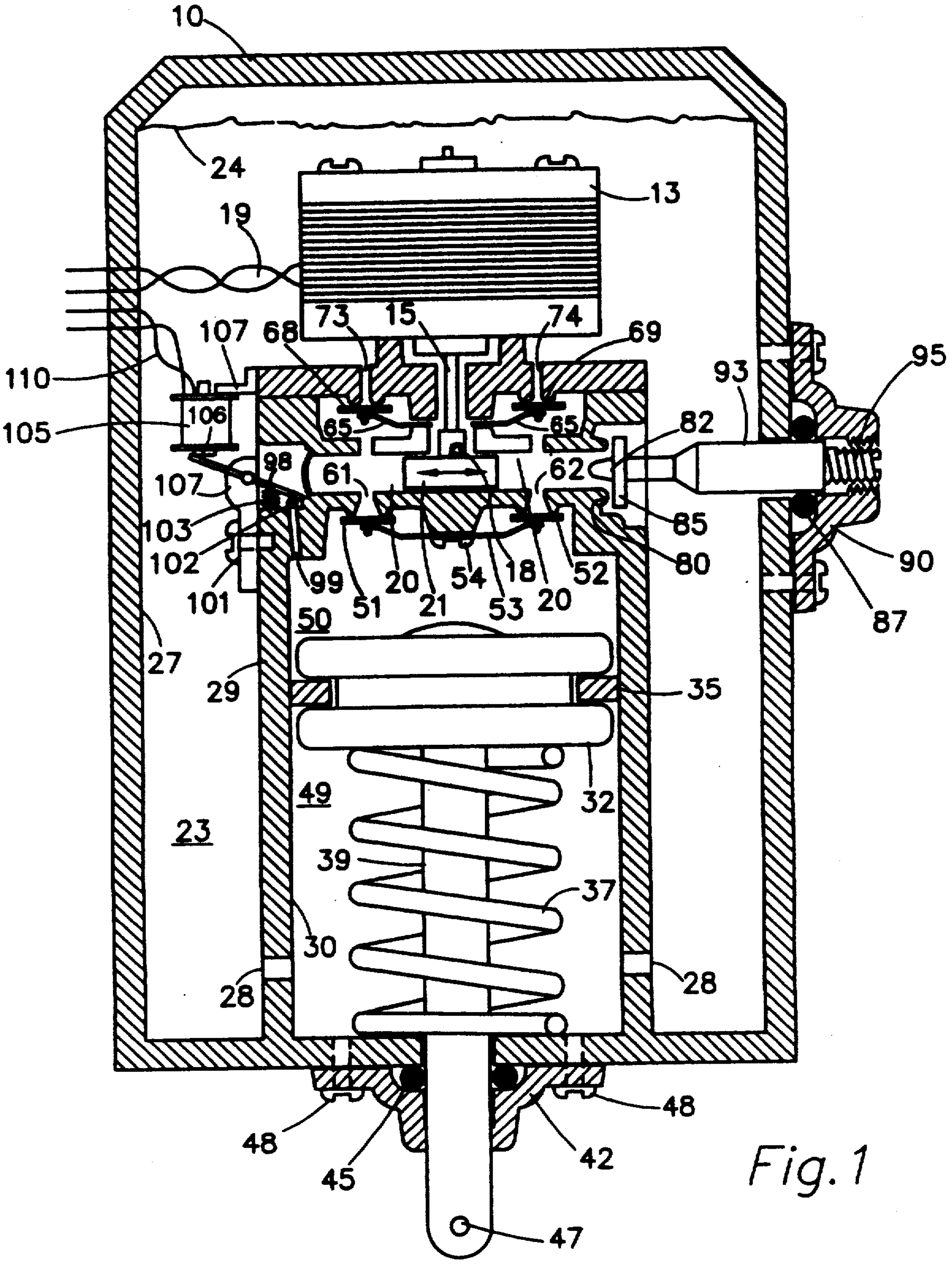

Turning to the Figure, the hydraulically operated actuator shown has a housing 10 divided into three main chambers. The first of these chambers is a reservoir 23 defined by interior wall 27 of housing wherein a supply of unpressurized hydraulic fluid is maintained, the surface of which is shown at 24. Within the reservoir 23, second and third chambers at 49 and 50 are defined by an interior cylinder 29 having an interior wall 30 and by a piston 32. The interior cylinder 29 is divided into the second and third chambers 49 and 50 by a piston 32 whose periphery is defined by a seal 35 which retains pressurized hydraulic fluid within the chamber at 50. Piston 32 is free to move linearly within cylinder 29. Chamber 49 communicates with reservoir 23 through ports 28 in cylinder 29, thereby allowing any hydraulic fluid leaking past seal 35 to reenter reservoir 23.

During operation of the actuator, the third chamber at 50 contains pressurized hydraulic fluid supplied by a pump comprising a piston 21 reciprocating within a pumping cylinder 20. The piston 21 divides cylinder 20 into left and right chambers thereof as shown in the Figure. Piston 21 is further driven by a an eccentric element 18 carried on the end of a shaft 15 of a drive motor 13. Electric power for motor 13 is supplied by a pair of conductors 19 which pierce the housing 10 at a convenient point. The pump further includes a pair of inlet check valves 68 and 69 held against their respective seats by a leaf spring 65, thereby allowing one way flow of hydraulic fluid from the reservoir through ports 73 and 74 into cylinder 20. Spring 65 may be fastened to the interior end of the top of interior cylinder 29 in any convenient fashion. When the pump is operating, pressurized hydraulic fluid is expelled from cylinder 20 through outlet ports 61 and 62. Check valves 51 and 52, which are held against their respective seats by a second leaf spring 53, prevent backflow of hydraulic fluid from the high pressure chamber at 50 into the pump cylinder 20. Spring 53 is shown held in place by a machine screw 54 embedded in the metal from which cylinder 20 is formed, but any convenient means of fastening same to the interior of the chamber at 50 is acceptable.

It is strongly preferred for a number of reasons that motor 13 and all of the elements of the pump are submerged in the hydraulic fluid. The hydraulic fluid can lubricate and cool motor 13 and the pump. The actuator can operate in any position if the level of the hydraulic fluid is high enough and the pump is centrally located. It is desirable to leave a small volume of air as shown within reservoir 23 to allow for expansion of the hydraulic fluid.

One can thus see that when power is supplied to pump motor 13 on conductors 19, the piston 21 is caused to reciprocate within cylinder 20, alternately drawing hydraulic fluid from the reservoir through ports 73 and 74 into the left and right chambers of cylinder 20, and again alternately, expelling the hydraulic fluid drawn into cylinder 20 through ports 61 and 62 into the chamber at 50. The pump is thus double acting in that two separate amounts of hydraulic fluid are injected into the chamber at 50 for a single complete rotation of motor shaft 15.

As the volume of hydraulic fluid expelled into the chamber at 50 increases, piston 32 is driven steadily away from its return position adjacent the outlet check valves 51 and 52 and thereby decreasing the volume of the chamber at 49. A shaft or connecting rod 39 is attached to piston 32 and provides the actuator output. Shaft 39 passes through the bottom end of housing 10, where a seal 45 held in place by a cap 42 prevents any hydraulic fluid leakage past shaft 39 from the chamber at 49. Note that seal 45 need not retain pressurized hydraulic fluid contained in the chamber at 50. Shaft 39 may be fastened by its attachment hole 47 to any element of a device which one desires to move. A bracket or other mounting feature, not shown, must be provided to fasten housing 10 to the device whose element is to be operated.

As a safety feature, this actuator is designed so that shaft 39 can be driven out of housing 10 only when an enabling voltage is applied to conductors 110. Conductors 110 pierce housing 10 at a convenient point to supply the enabling voltage to an electromagnet 105. The enabling voltage causes electromagnet 105 to attract the end of an armature 98 to the electromagnet's core end 106. Armature 98 is pivotably mounted on a bracket 107 fastened to the outside of inner cylinder 29 so that when enabling voltage is present on conductors 110, a ball 102 is pressed with a predetermined force against a seat end of a relief valve port 99. The attractive force of electromagnet 105 when enabling voltage is present, relative lengths of the two arms of the armature 98, and the cross sectional area of the seat end are all chosen so that pressure within the chamber at 50 in excess of a predetermined amount will allow pressurized hydraulic fluid to escape through port 99, thereby relieving the pressure within the chamber at 50. Further, one can easily see that if enabling voltage on conductors 110 is not present, there is no attractive force on armature 98 supplied by electromagnet 105, and the relief valve port 99 remains unobstructed, preventing actuation of piston 32. Spring 103 positively holds the relief valve open when enabling voltage is not present. When enabling voltage is removed from conductors 110 after shaft 39 has been driven out of housing 10 by any amount, return spring 37 applies force to piston 32 urging it back to its rest or return position adjacent valves 51 and 52. This provides for additional safety in that when power is removed from the actuator, its output element returns automatically to its return position.

As was mentioned in the background discussion, an ongoing problem in the use of these electrically operated actuators is controlling the speed at which the output element is driven by the motor during normal operation. This is accomplished very effectively with a diverter valve which is integral with one chamber of the pump and includes a valve element 82 moveably positioned at one end of pumping cylinder 20. Valve element 82 is integral with a valve stem 93 which forms an adjustment shaft. Valve stem 93 has a threaded projection 95 at the end opposing valve element 82. Stem 93 penetrates the wall of housing 10 so as to be accessible from outside of the housing 10. A cap 90 is mounted to the outside surface of housing 10 and presses seal 87 against both stem 93 and the outside surface of housing 10 thereby preventing escape of any hydraulic fluid. The threads on projection 95 engage mating threads in the opening of cap 90, and a slot at the very end of projection 95 allows one to rotate stem 93 with a screwdriver.

As stem 93 is rotated, the setting of the diverter valve changes. The engagement of the threads on projection 95 and cap 90 axially translates stem 93 when stem 93 is rotated. This changes the spacing or clearance between a collar 85 on stem 93 adjacent the valve element 82 and a seat portion 80 formed in the interior cylinder 29 adjacent to or at the end of chamber 20 and in flow communication therewith. When space is present between collar 85 and seat 80, a portion of the hydraulic fluid entering the adjacent volume of chamber 20 is expelled through the diverter valve rather than through the check valve of port 62. Changing this spacing changes the pressure drop which arises across the seat portion 80 during operation of the pump A selected spacing between collar 85 and seat 80 results in a selected amount of hydraulic fluid flowing through the diverter valve rather than passing through the check valve formed by port 62 and valve 52. Experience shows that operating speed for piston 32 resulting from a particular position of valve stem 93 is very stable and quite independent of load. Further, the conical taper in valve element 82 allows quite precise adjustment of the amount of hydraulic fluid which passes through the diverter valve, and this results in the ability for very precise adjustment of the speed of travel for shaft 39. The ability to use a common hand tool to adjust the speed of travel in an actuator using a relatively cheap, constant speed electric motor 13 as its source of power without having to dismantle the actuator is extremely convenient. This invention allows a single actuator to replace a number of different models in an inventory, which greatly reduces the cost at which they may be supplied to the ultimate consumers.

In this design, rate of travel of the shaft 39 is continuously adjustable from 100% of its maximum speed to 50% of its maximum speed because a diverter valve is provided only for one of the two chambers of the pump cylinder 20. It is possible to provide a second diverter valve for the other chamber of cylinder 20 or to vary the geometry of the pump elements so as to allow one of the pump chambers to provide a greater amount of hydraulic fluid than the other. On the other hand, it is my experience that the ability to adjust the speed of travel between 50% of maximum and 100% of maximum is adequate for the vast majority of applications for which such an actuator is typically used.

It can be seen from the above that operating speed of an actuator built according to the teachings of this specification can be easily adjusted without disassembling the actuator. Nor is it necessary to supply a number of different actuator models in order to have available an actuator having an operating speed suitable for a particular installation. At the same time, this enhanced speed adjustment feature has not required a radical redesign of the device, which results in smaller design and tooling costs and added confidence of satisfactory operation over a long service life.

The preceding has described my invention. What I wish to protect by letters patent is as follows:

1. A linear actuator of the type having a housing, a hydraulic cylinder mounted in the housing and in which slides a piston having a connecting rod providing the actuator output, a motor mounted in the housing, a reservoir in the housing and containing a supply of hydraulic fluid, and a pump driven by the motor and having a pumping chamber having an intake port in flow communication with the reservoir and an outlet port in flow communication with the cylinder, wherein the improvement comprises a manually adjustable diverter valve in flow communication with the outlet port and the reservoir, for diverting pressurized hydraulic fluid from the outlet port to the reservoir, wherein the reservoir has a wall and wherein the pump is immersed in the hydraulic fluid in the reservoir, and wherein the diverter valve has a seat in flow communication with the pumping chamber, and a valve element, said valve element including a portion thereof facing the pumping chamber, and said valve element further including an adjustment shaft penetrating the reservoir wall, by which the valve is accessible for adjustment from outside the reservoir.

2. The actuator of claim 1, including a seal element in sealing contact with the reservoir wall and the adjustment shaft, said seal element preventing leakage of the hydraulic fluid from the reservoir wall past the adjustment shaft.

3. The actuator of claim 1, wherein the wall includes a circular hole through which the adjustment shaft passes, said circular hole and said adjustment shaft engaging threads, whereby rotation of the adjustment shaft changes the setting of the diverter valve.

* * * * *

UNITED STATES PATENT AND TRADEMARK OFFICE

CERTIFICATE OF CORRECTION

PATENT : 5,611,200

DATED : March 18, 1997

INVENTOR(S) : Patrick R. Moenkhaus

It is certified that error appears in the above-identified patent and that said Letters Patent is hereby corrected as shown below:

On the title page, Figure 1 should appear as the illustrative figure, as shown on on the attached page.

On the title page, after item [57] Abstract, "3 Claims, No Drawings" should read --3 Claims, 1 Drawing Sheet--.

Add the Drawing Sheet, consisting of FIG. 1, as shown on the attached page.

Signed and Sealed this

Tenth Day of February, 1998

Attest:

Bruce Lehman

BRUCE LEHMAN

*Attesting Officer*

*Commissioner of Patents and Trademarks*

United States Patent [19]
Moenkhaus

[11] Patent Number: 5,611,200
[45] Date of Patent: Mar. 18, 1997

[54] LINEAR HYDRAULIC ACTUATOR WITH ADJUSTABLE OUTPUT SPEED

[75] Inventor: Patrick R. Moenkhaus, Mounds View, Minn.

[73] Assignee: Honeywell Inc., Minneapolis, Minn.

[21] Appl. No.: 98,147

[22] Filed: Jul. 28, 1993

[51] Int. Cl.[6] .......... F16D 31/02
[52] U.S. Cl. .......... 60/477; 60/494; 417/440
[58] Field of Search .......... 60/370, 371, 407, 60/408, 477, 478, 494; 91/246, 252, 262, 249, 263, 271, 272, 273, 274, 335, 336, 356; 417/440

[56] References Cited

U.S. PATENT DOCUMENTS

| | | | |
|---|---|---|---|
| 2,669,095 | 2/1954 | Berger | 60/477 |
| 2,724,433 | 11/1955 | Witherell | 417/440 |
| 2,737,928 | 3/1956 | Neff et al. | 91/356 |
| 3,272,132 | 9/1966 | Stoelting et al. | 417/440 |
| 3,295,748 | 1/1967 | Leitgeb | 417/440 |
| 3,375,758 | 4/1968 | Novak et al. | 91/356 |
| 3,412,685 | 11/1968 | Connelly | 417/440 |
| 3,503,304 | 3/1970 | Comeau et al. | 91/336 |
| 3,677,456 | 7/1972 | Ramspeck et al. | 91/356 X |
| 3,685,396 | 8/1972 | Obergfell | 91/356 |
| 3,817,034 | 6/1974 | Nott | 60/478 |
| 3,943,830 | 3/1976 | Sugivra | 92/63 |
| 4,161,308 | 7/1979 | Bell et al. | 91/336 X |
| 4,213,301 | 7/1980 | Maier et al. | 60/407 |
| 4,422,831 | 12/1983 | Schmid | 417/440 X |
| 4,435,134 | 3/1984 | Okada et al. | 417/440 X |
| 4,662,603 | 5/1987 | Etheridge | 251/63.5 |
| 4,838,768 | 6/1989 | Flaherty | 417/440 X |
| 5,097,857 | 3/1992 | Mayhew | 137/1 |
| 5,109,812 | 5/1992 | Erickson et al. | 123/90.12 |

*Primary Examiner*—Hoang Nguyen
*Attorney, Agent, or Firm*—Edward L. Schwarz

[57] ABSTRACT

A linear hydraulic actuator has a reciprocating pump which provides pressurized hydraulic fluid contained in a reservoir to a hydraulic cylinder in which slides a piston which supplies the actuator output. A diverter valve in flow communication with the pressurized hydraulic fluid has an adjustment shaft allowing manual adjustment of the rate of flow of pressurized hydraulic fluid to the cylinder. Preferably the pump is immersed in the hydraulic fluid held by the reservoir, and the adjustment shaft of the diverter valve penetrates a wall of the reservoir to allow external adjustment of the diverter valve.

3 Claims, 1 Drawing Sheet

1/1

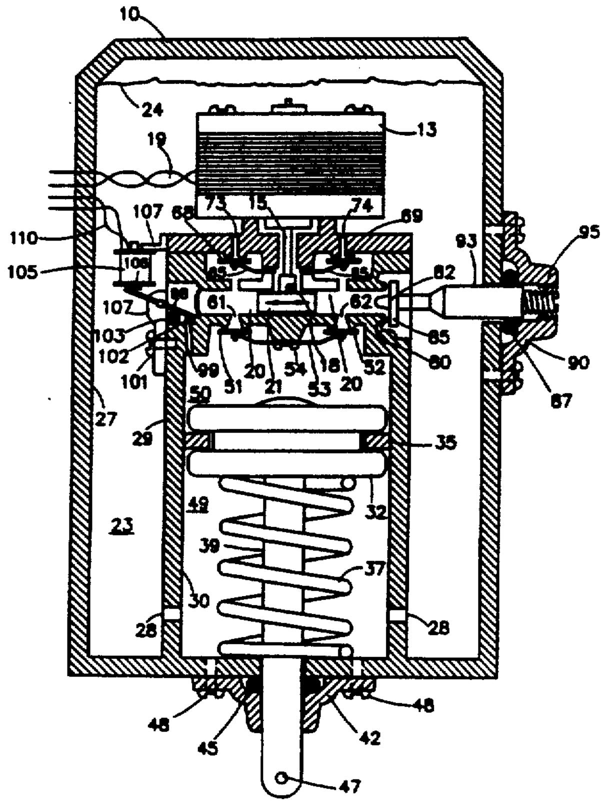

1/1

UNITED STATES PATENT AND TRADEMARK OFFICE

CERTIFICATE OF CORRECTION

PATENT NO. : 5,611,200
DATED : Mar. 18, 1997
INVENTOR(S) : Patrick R. Moenkhaus

It is certified that error appears in the above-identified patent and that said Letters Patent is hereby corrected as shown below:

This certificate supersedes Certificate of Correction issued February 10, 1998.

The title page should be deleted to appear as per attached title page.

Add the drawing sheet consisting of FIG. 1, as shown on the attached page.

Signed and Sealed this

Seventh Day of July, 1998

Attest:

Bruce Lehman

BRUCE LEHMAN

*Attesting Officer* *Commissioner of Patents and Trademarks*

United States Patent [19]
Moenkhaus

[11] Patent Number: 5,611,200
[45] Date of Patent: Mar. 18, 1997

[54] LINEAR HYDRAULIC ACTUATOR WITH ADJUSTABLE OUTPUT SPEED

[75] Inventor: Patrick R. Moenkhaus, Mounds View, Minn.

[73] Assignee: Honeywell Inc., Minneapolis, Minn.

[21] Appl. No.: 98,147

[22] Filed: Jul. 28, 1993

[51] Int. Cl.[6] .......... F16D 31/02

[52] U.S. Cl. .......... 60/477; 60/494; 417/440

[58] Field of Search .......... 60/370, 371, 407, 60/408, 477, 478, 494; 91/246, 252, 262, 249, 263, 271, 272, 273, 274, 335, 336, 356; 417/440

[56] References Cited

U.S. PATENT DOCUMENTS

| | | | |
|---|---|---|---|
| 2,669,095 | 2/1954 | Berger | 60/477 |
| 2,724,433 | 11/1955 | Witherell | 417/440 |
| 2,737,928 | 3/1956 | Neff et al. | 91/356 |
| 3,272,132 | 9/1966 | Stoelting et al. | 417/440 |
| 3,295,748 | 1/1967 | Leitgeb | 417/440 |
| 3,375,758 | 4/1968 | Novak et al. | 91/356 |
| 3,412,685 | 11/1968 | Connelly | 417/440 |
| 3,503,304 | 3/1970 | Comeau et al. | 91/336 |
| 3,677,456 | 7/1972 | Ramspeck et al. | 91/356 X |
| 3,685,396 | 8/1972 | Obergfell | 91/356 |
| 3,817,034 | 6/1974 | Nott | 60/478 |
| 3,943,830 | 3/1976 | Sugivra | 92/63 |
| 4,161,308 | 7/1979 | Bell et al. | 91/336 X |
| 4,213,301 | 7/1980 | Maier et al. | 60/407 |
| 4,422,831 | 12/1983 | Schmid | 417/440 X |
| 4,435,134 | 3/1984 | Okada et al. | 417/440 X |
| 4,662,603 | 5/1987 | Etheridge | 251/63.5 |
| 4,838,768 | 6/1989 | Flaherty | 417/440 X |
| 5,097,857 | 3/1992 | Mayhew | 137/1 |
| 5,109,812 | 5/1992 | Erickson et al. | 123/90.12 |

*Primary Examiner*—Hoang Nguyen
*Attorney, Agent, or Firm*—Edward L. Schwarz

[57] ABSTRACT

A linear hydraulic actuator has a reciprocating pump which provides pressurized hydraulic fluid contained in a reservoir to a hydraulic cylinder in which slides a piston which supplies the actuator output. A diverter valve in flow communication with the pressurized hydraulic fluid has an adjustment shaft allowing manual adjustment of the rate of flow of pressurized hydraulic fluid to the cylinder. Preferably the pump is immersed in the hydraulic fluid held by the reservoir, and the adjustment shaft of the diverter valve penetrates a wall of the reservoir to allow external adjustment of the diverter valve.

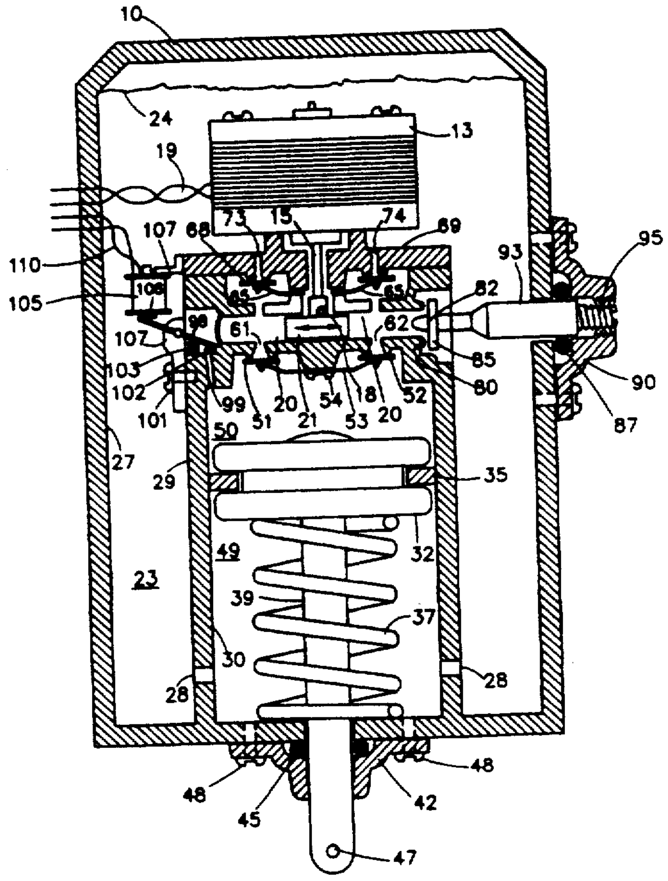

3 Claims, 1 Drawing Sheets